Nov. 28, 1961    H. RUMSEY, JR    3,010,262
METHOD OF MAKING PACKAGES WRAPPED IN
FLEXIBLE SHEET MATERIAL
Filed Oct. 8, 1958    6 Sheets-Sheet 1

INVENTOR.
HERBERT RUMSEY JR.
BY
ATTORNEYS

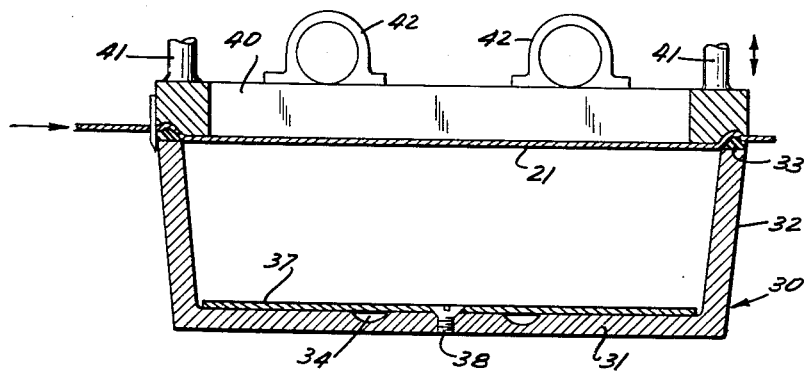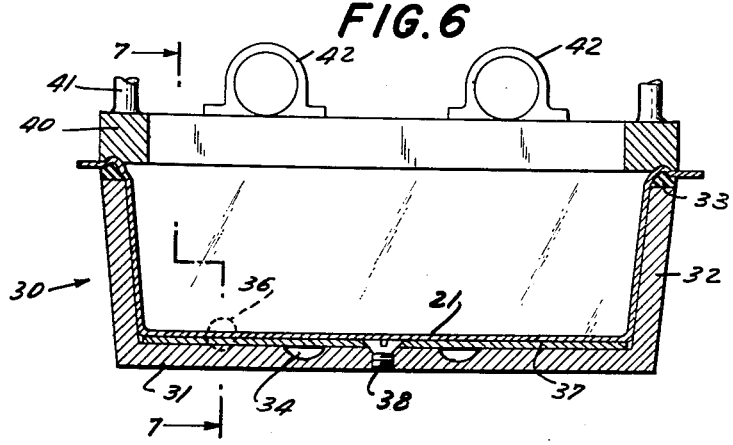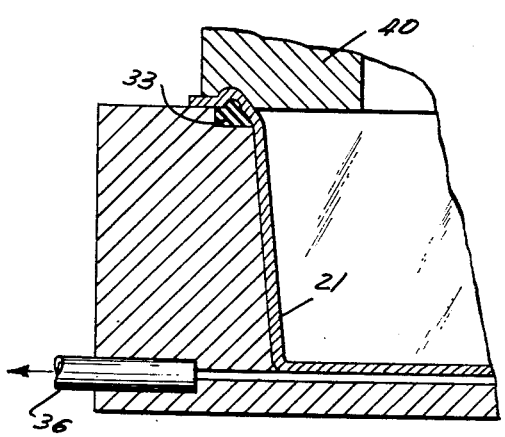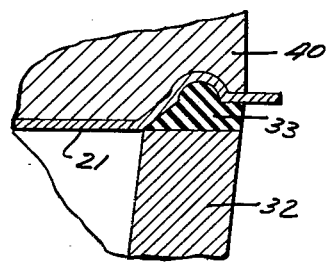
INVENTOR.
HERBERT RUMSEY JR.
ATTORNEYS

INVENTOR.
HERBERT RUMSEY JR.
BY
Kane, Dalsimer and Kane
ATTORNEYS

INVENTOR.
HERBERT RUMSEY JR.
BY Kane, Dalsimer and Kane
ATTORNEYS

Nov. 28, 1961   H. RUMSEY, JR   3,010,262
METHOD OF MAKING PACKAGES WRAPPED IN
FLEXIBLE SHEET MATERIAL
Filed Oct. 8, 1958   6 Sheets-Sheet 5
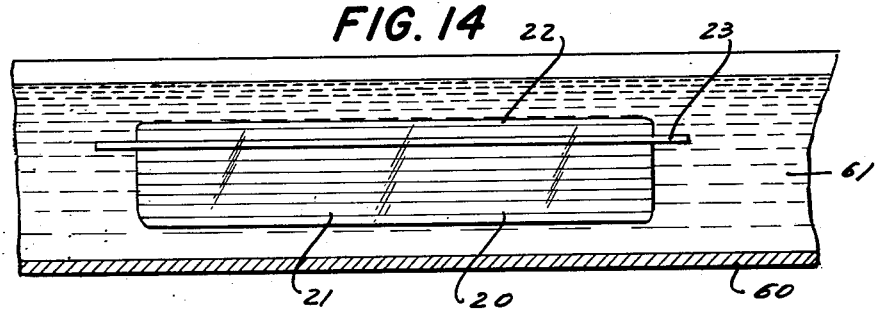
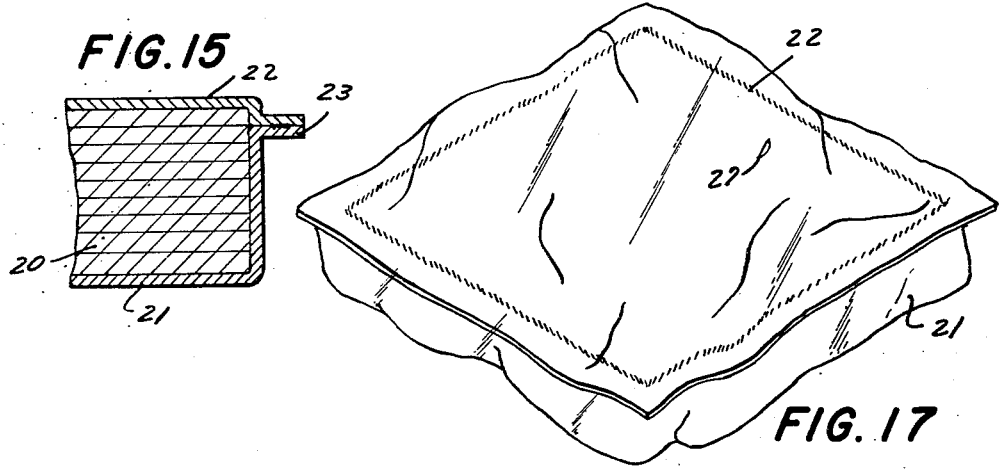
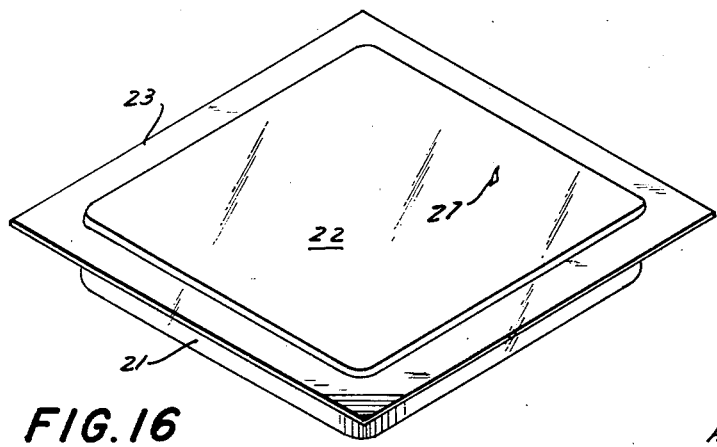
INVENTOR.
HERBERT RUMSEY JR.
BY
ATTORNEYS Nov. 28, 1961 H. RUMSEY, JR 3,010,262
METHOD OF MAKING PACKAGES WRAPPED IN
FLEXIBLE SHEET MATERIAL
Filed Oct. 8, 1958 6 Sheets-Sheet 6
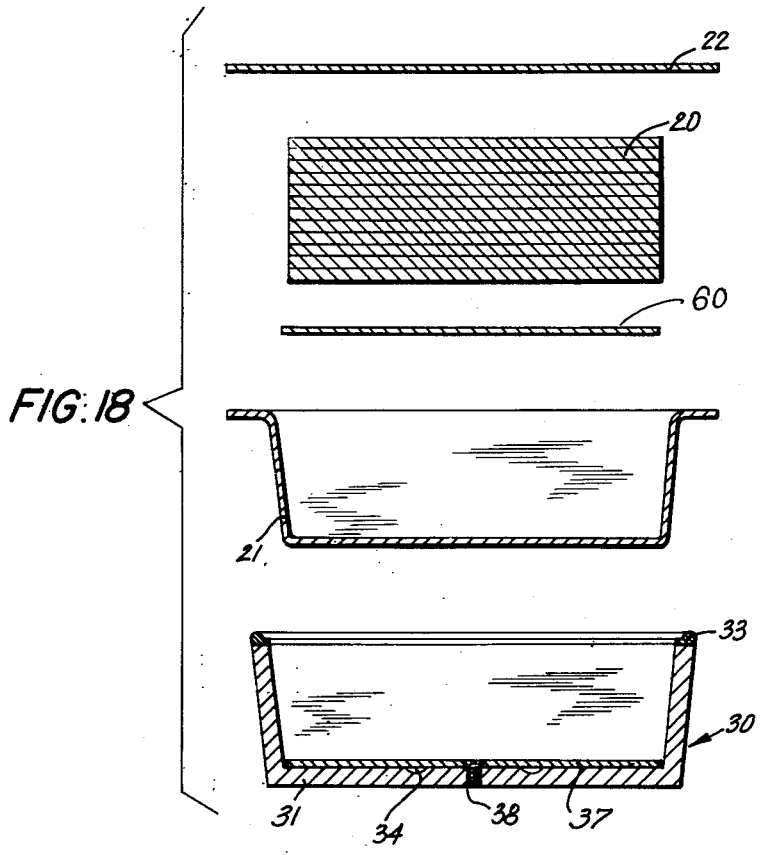
FIG.18
FIG.19
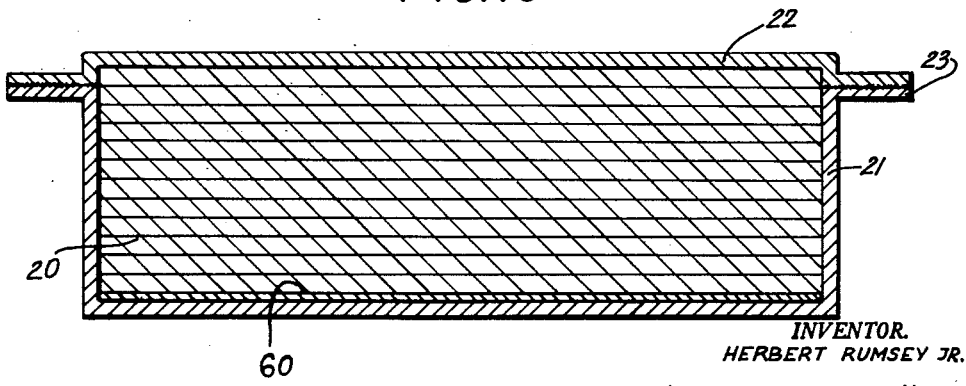
INVENTOR.
HERBERT RUMSEY JR.
BY Kane, Dalsimer & Kane
ATTORNEYS

United States Patent Office 3,010,262
Patented Nov. 28, 1961

3,010,262
METHOD OF MAKING PACKAGES WRAPPED IN FLEXIBLE SHEET MATERIAL
Herbert Rumsey, Jr., P.O. Box 630, Rochester, N.Y.
Filed Oct. 8, 1958, Ser. No. 766,136
3 Claims. (Cl. 53—30)

This invention relates to an improved method of forming packages, particularly packages which are evacuated or partially evacuated, which are wrapped in flexible sheet material and also to an improved package resulting therefrom.

In modern merchandising, it is desirable to wrap certain types of products, such as food products, in attractive protective wrappings of sheet wrapping material. In this connection, the wrapping should fit snugly or tightly around the package contents and should be free from unsightly wrinkles, in order to present the desired attractive appearance. For most purposes, it is desirable that at least a portion of the wrapping be transparent so as to display the package contents.

In one form of package in commercial use for the packaging of food products, two sheets of thermoplastic material are used in wrapping the package. One sheet is provided with a cup-shaped portion and the package contents are disposed therein. The second sheet of thermoplastic material is disposed over the open side of the cup-shaped portion to provide the base portion of the package. The peripheral areas of the cup-shaped and base portions of the package are heat sealed together and the air is partially evacuated from the interior of the package.

If a package is properly formed, the differential in pressure between the exterior and interior of the package resulting from the evacuation thereof causes the wrapper to tightly embrace the food contents. Unfortunately, however, experience has shown that packages of this type frequently develop leaks either due to faulty wrapping procedures, defects in the wrapping material, or subsequent perforation thereof. Packages of this type are unsatisfactory, are referred to in the trade as "leakers," and present a number of well-recognized problems. Thus, in leaking packages of this type, the wrapper becomes loose and unsightly and in very short time separates from the package contents, permitting air to enter into the interior of the package and to oxidize and adversely affect the package content and to cause discoloration and deterioration thereof. The consumer resistance to packages with punctured wrappers is such that it results in substantial loss to the packer.

It is an important object of the present invention to overcome the difficulties and disadvantages described above and to provide an improved package of the above type together with an improved method of making the package wherein the package continues to present the same attractive appearance with the wrapper free from wrinkles and tightly embracing the package contents and effectively affording protection thereto and preventing discoloration thereof, even though apertures develop in the encasing wrapper.

A further object is the provision of an improvement upon the method of making packages of the above type which is relatively simple and inexpensive and will not materially add to the cost of the package.

My invention contemplates the provision of an improved packaging method wherein the package contents are encased in a sealed wrapper consisting of a plurality of sheets of wrapping material. One of the sheets is made of thermoplastic material and is formed with a package-contents receiving cavity and is prestressed or tensilized so that when heat is applied thereto, it will shrink. Another of the sheets is not prestressed or tensilized and is applied over the package contents and the open face of the cavity and is sealed to the marginal areas of the first sheet while air is withdrawn from the cavity. The wrapper of the sealed package is heated so as to cause the first sheet to shrink and smoothly embrace and tightly engage the package contents and so as to cause the second sheet to stretch smoothly over the end of the package contents and the cavity and to overlap a portion of the sides of the package contents. Thus, I provide a package having an attractive wrapper which is smooth and free from wrinkles and which will tightly engage the package contents so that it will not separate therefrom even when the wrapper is punctured.

In the accompanying drawings,

FIG. 4 is a cross-sectional view in the direction of the arrows of the line 4—4 of FIG. 3;

FIG. 5 is an enlarged sectional detailed view illustrating the edge portion of the vacuum-forming apparatus shown in FIGS. 3 and 4 and showing the manner in which the clamp seals the marginal area of the first sheet of wrapping material thereto;

FIG. 6 is a cross-sectional view similar to FIG. 4 illustrating a further step in my method in which the first sheet of wrapping material has been formed or shaped;

FIG. 7 is a detailed sectional view through the assembly shown in FIG. 6 in the direction of the arrows of the line 7—7 of FIG. 6;

FIG. 14 is a partially sectional side elevational view showing one method of heating the wrapper to cause shrinking of the first sheet;

FIG. 15 is a detailed cross-sectional view illustrating the relationship between the sealed marginal area of the sheets after shrinking and also illustrating the manner in which the wrapper smoothly embraces and tightly engages the package contents;

FIG. 16 is a perspective view of a completed package having a puncture or aperture therein and illustrating how the wrapper nevertheless continues to smoothly embrace and tightly engage the package contents;

FIG. 17 illustrates the manner in which the wrapper separates from the package contents and becomes loose when a package of the type heretofore used which was not subjected to a shrinking operation, was punctured;

FIG. 18 is an exploded view in section illustrating the components and the mold used in making a modified form of package having a label with a similar coefficient of contraction to the prestressed wrapping material; and FIG. 19 is a cross-sectional view of the modified form of package having the label incorporated therein so as to be displayed through one face of the package.

Figure 1:
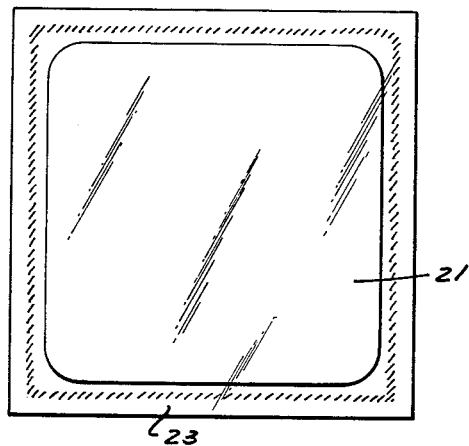
FIGS. 1 and 2 are top plan and side elevational views respectively of a finished package embodying my invention and made in accordance with my improved method.
Figure 2:
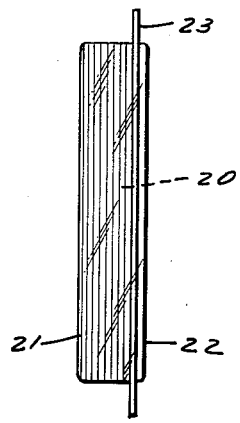

A package embodying my invention is shown in FIGS. 1, 2, 15 and 16. It comprises essentially package contents 20 encased in a flexible, protective wrapper presenting an attractive appearance and formed of a first sheet 21 of thermoplastic material and a second sheet 22 which is sealed to marginal areas of the first sheet. The first sheet 15 is formed so as ot be generally convex on its outer surface and concave on its inner surface providing a cavity for receiving the package contents surrounded by a marginal area 23 which extends completely therearound and is disposed in substantially the same plane throughout. The second sheet 22 has continuous sealing engagement with the marginal area of the first sheet extending completely around the cavity and the air in the interior of the cavity and package has preferably been at least partially evacuated prior to sealing.

The first sheet of wrapping material when formed with the cavity is prestressed or tensilized and the second sheet is in unstressed condition. When the package has been sealed, the wrapper is subjected to a heat treatment causing the first sheet to shrink to smoothly embrace and tightly engage the package contents and so as to stretch the second sheet smoothly across the protruding end of the package contents into overlapping relationship with the sides of the package contents.

In a package made in accordance with my invention, a puncture of the wrapper in the manner indicated at 27 in FIG. 16 has little or no effect upon the package and the wrapper remains in tight engagement with the package contents and continues to smoothly embrace it. Thus, even where the wrapper is punctured, my package continues to present the same attractive appearance and the contents are effectively protected against discoloration and deterioration. On the other hand, in packages of the type heretofore available, in which the first sheet of wrapping material is not subjected to a shrinking operation, a puncture results in the condition shown in FIG. 17. It will be seen that in this case, the wrapper becomes loose and separates from the package contents, resulting in discoloration and deterioration of the package contents.

The method of making my package is illustrated in FIGS. 3 through 14. As the first step in performing my method, the first sheet of wrapping material 21 is subjected to a forming or drawing operation. The sheet 21 is made of a thermoplastic material which, when heated, can be formed or shaped. It should also be capable of being prestressed or tensilized by being heated to a temperature at which it becomes plastic and then stretched and thereafter cooled while in stretched condition. Due to this prestressed or tensilized condition, the sheet can thereafter be shrunk by heating it to a temperature at which the molecules will flow. The sheet wrapping material 21 also should preferably be transparent so that the package contents will be displayed therefrom. In addition, the material should be impervious to air and other fluids so as to provide protection to the package contents and so as to maintain the package in evacuated or partially evacuated condition.

Sheet wrapping materials having the desired characteristics are known in the art, as for example: the various polymers and copolymers of polyvinylidene chloride such as those available commercially under the trademark "Cry-O-Vac," and under the trademark "Saran"; rubber hydrochloride such as that sold commercially under the trademark "Pliofilm"; and polyester films such as polyethylene terephthalate available commercially under the trademark "Mylar." In addition, various laminations of films of this type may be employed. I have found that very satisfactory results are obtained by employing a laminated film consisting of a polyethylene terephthalate ("Mylar") approximately .0005" in thickness, laminated to a polyethylene film approximately .0025" in thickness by a thin layer of a copolymer of polyvinylidene chloride. A film of this type has sufficient stiffness and body to retain its form and shape without the aid of any outside support and I have found that this is an advantage in the packaging of certain types of materials. However, other films of the above-indicated type of homogeneous or laminated form may be employed.

The sheet 21 is heated to a temperature at which it becomes plastic and is then suitably formed or drawn so as to provide a convex outer surface and a concave inner surface with a cavity or pouch for receiving the package contents. The sheet may be formed in any suitable manner, but I have found that one convenient method of forming the sheet is by heating and then utilizing suction and atmospheric pressure to conform the sheet to a mold or die.

In FIGS. 3 through 12, I have illustrated suitable vacuum-forming apparatus in the form of a mold 30 consisting of a receptacle having a base 31 and side walls 32 and provided with a beaded gasket 33, made of a resilient sealing material such as natural or synthetic rubber, extending around the upper surface of the wall. The base of the mold is formed with channels 34 connecting the corners of the mold through a circular portion to a vacuum trough or chamber 35 whereby air from all portions of the mold can be readily withdrawn through suction line 36. A platen or base plate 37 is secured over the base inside the mold as by screw 38 and serves to provide a smooth lower surface to the mold to impart the proper smooth appearance to the formed wrapper. The corners of the base plate are cut away as indicated at 39 so as to afford communication between the interior of the mold and the channels 34.

Figure 3:
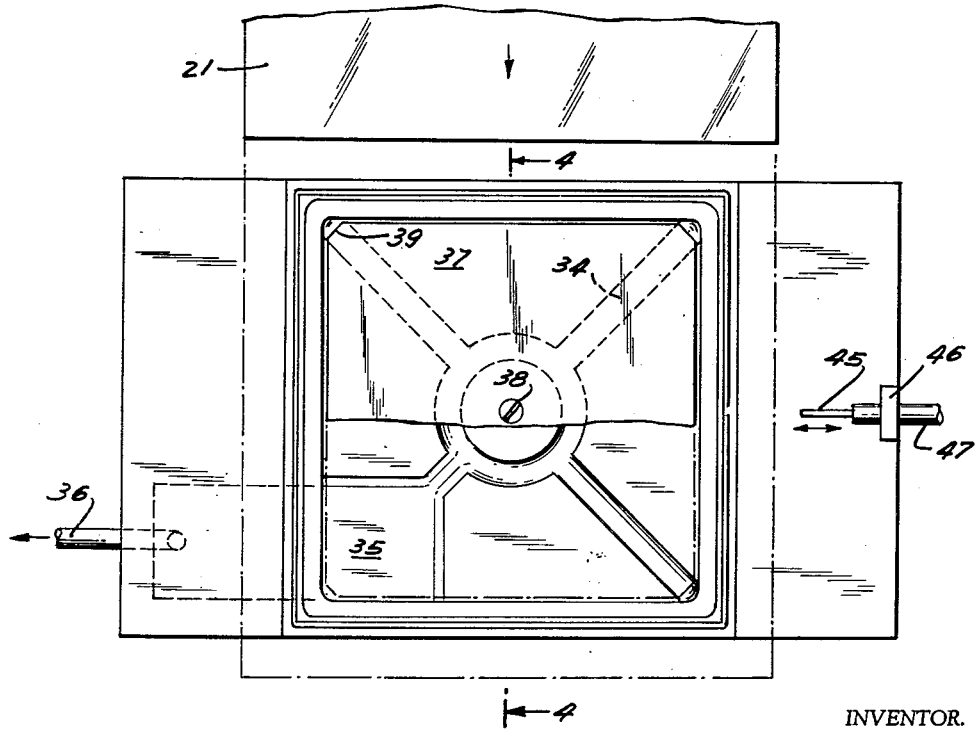
FIG. 3 is a top plan view of vacuum-forming apparatus with a first sheet of wrapping material associated therewith and in position to be pulled thereover illustrating the first step in carrying out my invention.

Sheet 21 of appropriate size to cover the open face of the mold is superimposed over the mold as indicated in FIGS. 3 and 4. In this connection, the sheet 21 may be immediately cut to the desired peripheral size of the package and marginal sealed area or it may be larger than required and cut to size during one of the subsequent operations.

When sheet 21 is in proper position over the mold, a clamp 40, which has relative vertical movement with respect to the mold, is shifted downwardly to clamp the marginal areas of the sheet to the beaded gasket 33 formed around the upper edge of the mold. The clamp, as shown, is of proper size and shape to engage the upper surface of the wall of the mold and is recessed to accommodate the beaded basket. The clamp is suitably supported by brackets 41 and is forced into clamping engagement with the beaded gasket with the marginal area of film 21 secured therebetween, as shown in FIGS. 4 to 7 inclusive.

Thereafter, film 21 is heated to a temperature at which it becomes plastic and the vacuum line 36 is connected so as to withdraw air from the interior of the mold below the clamped sheet. I have found that sheets of the type indicated above become pastic and can be formed and drawn very satisfactorily at temperatures between 300 and 350° F. The heating of the film may be accomplished in any suitable fashion as for instance by means of one or more heating lamps 42 mounted on the clamp, as shown. In FIG. 4, the sheets 21 is shown clamped in position prior to heating and forming. FIGS. 6 and 7 illustrate the condition of sheet 21 after heating and after the application of vacuum or suction thereto. When the suction is drawn inside the mold, atmospheric pressure forces the unsupported central area of the film uniformly downwardly into engagement with the sides and base plate of the mold. After the sheet has been thus formed, the heating source is removed or shut off and the film is cooled in its formed condition with the result that it is prestressed or tensilized and, when it is heated to a temperature at which the molecules will flow, it will then shrink. This characteristic is utilized in a later step in my process for providing a wrapper which smoothly embraces and tightly engages the package contents.

After sheet 21 has thus been formed and prestressed, it will be seen that it is provided with a convex outer surface and a concave inner surface with a package-contents receiving cavity or pouch surrounded by a marginal area 23 extending completely around the cavity and disposed in the same horizontal plane so that a continuous seal can readily be formed therewith. The desired package contents are then placed in the cavity of the sheet while it is still in the mold, as shown in FIG. 8.

My method and package may be used in packaging many different types of commercial products. It is particularly suitable for use for those products which should be merchandised in attractive packages and which should be protected from the atmosphere or from contamination. As an example, my invention is particularly suitable for the packaging of food products, pharmaceuticals, biologicals, cosmetics and merchandise made from natural rubber and similar materials. In the drawings, I have illustrated my invention as applied to the packaging of a sliced food product such as a sliced meat product, as shown at 20.

Figure 8:
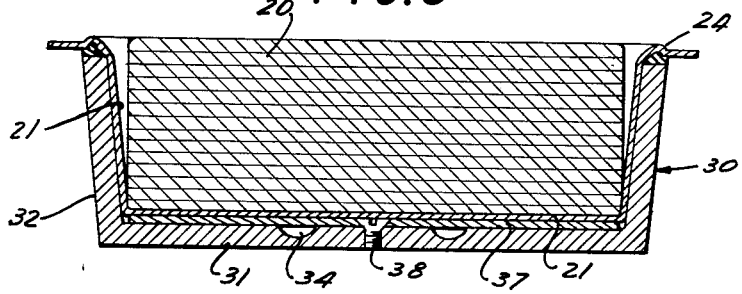
FIG. 8 is a cross-sectional view similar to FIGS. 4 and 6 but illustrating a further step in my method in which the package contents have been placed in the pouch formed in the first sheet.
Figure 9:
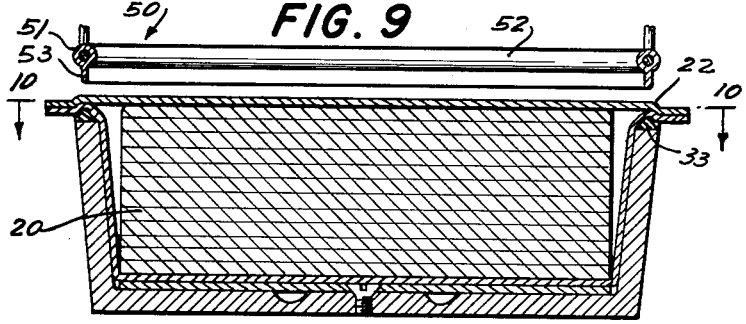
FIG. 9 is a cross-sectional view similar to FIG. 8 and illustrating the second sheet assembled with the package and clamping apparatus for retaining the second sheet in place while air is withdrawn from the interior of the cavity and while the second sheet is sealed to the first sheet.

Package contents of substantially the width of the base of the cavity is placed in the cavity so as to extend substantially to the top thereof, as shown in FIGS. 8 and 9. Thereafter, a second sheet of wrapping material 22 is applied over the package contents and over the open face of the cavity, as shown in FIG. 9, with the marginal areas thereof arranged in superimposed contact with the marginal area 23 of sheet 21.

Sheet 22 should be of a type that can be suitably sealed to the sheet 21 and should preferably be in unstressed or untensilized condition so that it will not shrink when heated. In addition, it should be impervious or substantially impervious to air and other fluids so as to provide protection to the package contents and so as to maintain the package in evacuated or partially evacuated condition. A thermoplastic film or a film having a thermoplastic coating serves very satisfactorily since it can be heat sealed to film 21. The sheet may be made of any of the materials indicated above in connection with sheet 21 and I have found that a laminated sheet of the type indicated serves very satisfactorily. I have found that it is desirable to use for certain packaging purposes a film which is self-supporting and will maintain its shape and form without outside support.

Figure 10:
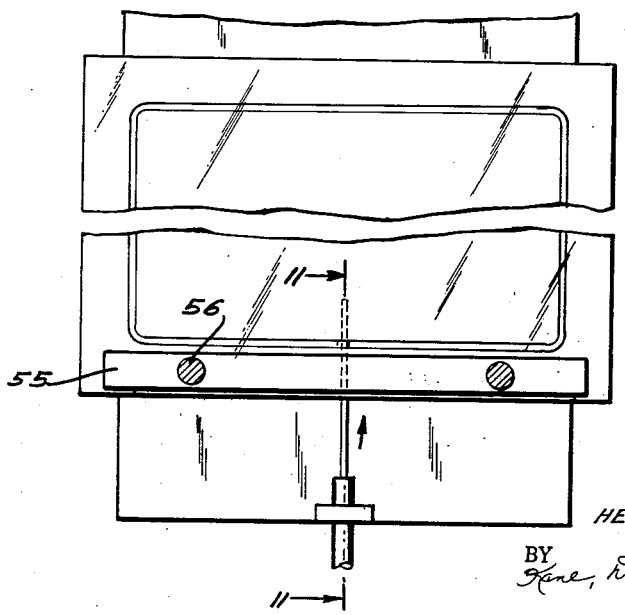
FIG. 10 is a plan view of the assembly shown in FIG. 9, while the flexible retainer shown in section, in the direction of the arrows on the line 10—10 of FIG. 9.

The film is applied over the food product and cavity, as shown in FIGS. 8, 9 and 10, and the marginal areas of sheets 21 and 22 are then sealed together while air is evacuated from the interior of the package.

Figure 11:
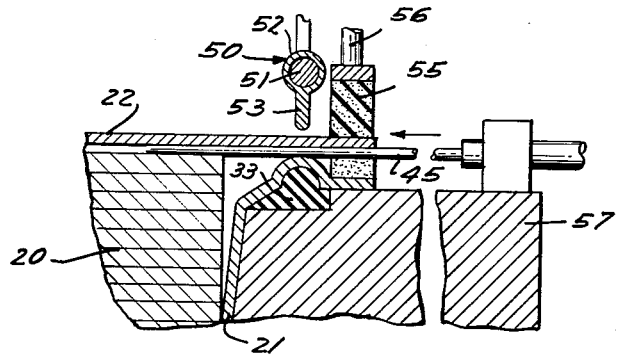
FIG. 11 is a detailed sectional view with portions omitted, illustrating one manner of withdrawing air from the cavity and taken in the direction of the arrows on the line 11—11 of FIG. 10.
Figure 12:
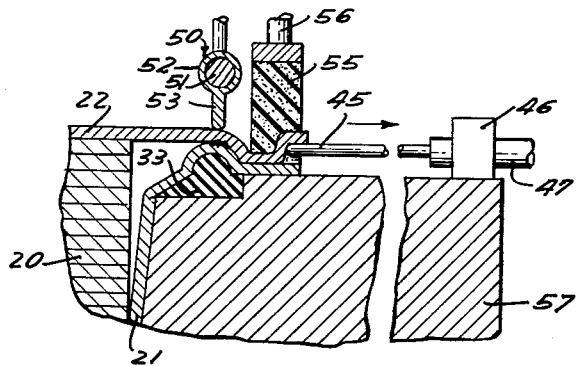
FIG. 12 is a similar detailed sectional view showing the cannula or needle for evacuating the cavity after it has been withdrawn from the interior of the package.

The air can be evacuated by means of a cannula 45 similar to a hypodermic needle which can be reciprocated horizontally from a position extending between the marginal portions of the sheets into the cavity, as shown for instance in FIGS. 10 and 11, to a position completely withdrawn therefrom, as shown in FIG. 12. In this connection, the needle may be mounted on a suitable bracket 46 having a bushing 47 for receiving and supporting the needle for reciprocating motion. The needle may be connected by a flexible tube to a source of suction or vacuum (not shown). I also provide means for holding the second sheet 22 in place and for sealing it to the marginal area of sheet 21 while air is extracted from the cavity. Thus, I provide a vertically shiftable heat sealer 50 of the same general size and shape as the beaded gasket 33 which extends around the upper end of mold 30. The heat sealer may be formed of an electrical resistance 51 with a covering of insulating material 52 having a depending flange 53 for engaging the marginal areas of the superimposed sheets 22 and 21 and pressing them against the beaded gasket 33. The resistance 51 is connected to a suitable source of electrical power (not shown) and is designed so that the temperature of the heat sealing flange 53 will heat seal the two sheets of material together. For materials of the type indicated above, I have found that temperatures in the range of 200 to 300° F. serve satisfactorily when the heat sealer is pressed against the superimposed layers.

Cannula 45 is inserted between the layers, as shown in FIGS. 10 and 11, and is connected to a source of vacuum to extract the air from the cavity prior to and during the heat sealing operation. To prevent undue leakage around the cannula, I provide a pressure member 55 in the from of a blade made of flexible resilient material such as foam rubber, synthetic foam rubber or synthetic foam plastic material. The blade is suitably mounted on an arm 56 and is vertically reciprocal. When the needle is extended into the cavity, the blade shifts downwardly to the position shown in FIGS. 11 and 12 so as to force the two edges of the superimposed layers of wrapping material together along the entire side of the package through which the needle is projected. A supporting platform 57 extends laterally from one side of the mold 30 and the flexible clamping blade 55 presses the two layers against the upper surface of the platform, immediately adjacent the beaded gasket 33. Since the blade is flexible, it yields sufficiently to straddle the needle 55. The edges of the two layers of wrapping material 21 and 22 are forced together and into engagement with platform 57 and beaded gasket 33 with the blade and wrapping material surrounding the needle so as to prevent leakage at this point.

While the needle is still inserted in the package and the clamping blade 55 is still in engagement with the edges of the sheets, the sealing member 50 is shifted downwardly into operative position so as to press the marginal areas of the two sheets against the bead and heat seal them together. The flange 53 of the heating blade and beaded gasket 33 are sufficiently flexible to accommodate the needle while the sealing is taking place. Immediately thereafter, the needle is withdrawn with the result that the marginal areas of the superimposed layers are immediately sealed together, as indicated in FIG. 12. Thus, the air is effectively withdrawn from inside the package by the cannula 45 and the sealing of the two layers takes place substantially simultaneously with the evacuation of the package. The sealing member and clamping blade 55 are then elevated and the package may be removed from the mold.

Figure 13:
FIG. 13 is a side elevational view of a sealed package prior to the shrinking operation.

The condition of the sealed package is indicated in FIG. 13. Due to the evacuation of the interior, the wrapper is drawn into tight engagement with the package contents. However, due the fact that the cavity of sheet 21 is necessarily somewhat larger in volume than the volume of the package contents, the wrapper has a number of wrinkles therein, as shown in FIG. 13. If the wrapper is punctured when the package is in this condition, the pressure of the interior is equalized with the pressure on the outside of the package and the wrapper becomes loose and separates from the package contents, as shown in FIG. 17. This results in an unsatisfactory package of unattractive appearance and the package contents will become discolored and deteriorated.

In order to obtain the advantages of my invention, I subject the sealed package in the form shown in FIG. 13 to heat treatment at a temperature at which the molecules in sheet 21 will flow so as to cause the sheet to shrink and smoothly embrace and tightly engage the package contents. Temperatures in the range of 200° to 210° F. serve very satisfactorily to cause the shrinkage of tensilized materials of the type indicated above.

One convenient method of heating the wrapper is to submerge the sealed package in a heated fluid such as hot water of a temperature between 200° and 210° F. In FIG. 14, I have illustrated a tank 60 having a heated fluid such as water shown at 61 and the sealed package of FIG. 13 has been submerged therein so as to cause sheet 21 to shrink. The liquid heats the wrapper uniformly and rapidly so that the shrinking takes place almost instantaneously when a package is submerged therein and accordingly the package can be immediately removed so that the heat will have no effect upon the contents thereof.

Since the sheet 22 is unstressed or untensilized, the shrinking is confined to sheet 21. As shown most clearly in FIGS. 14, 15 and 16, the shrinking of sheet 21 causes it to smoothly embrace and tightly engage the package contents. It also pulls the sealed marginal area 23 from the surface or end of the package to an intermediate point spaced from the end of the package thereby stretching or pulling the sheet 22 smoothly over the end of the package contents and into overlapping relationship with the side of the package. The package thus presents an attractive appearance with the wrapper free from wrinkles and in tight engagement with the package contents. Should a puncture develop in the wrapper, as indicated at 27 in FIG. 16, the wrapper will nevertheless remain in tight engagement with the package contents and will not separate therefrom. Thereafter, the attractive appearance of the package will be preserved and the wrapper will continue to protect the contents from discoloration and deterioration.

Either surface may serve as the top of my package. However, I prefer to use sheet 22 as the base and sheet 21 as the top of the package. Labelling and advertising material may be printed on one or both of the sheets or separate labels may be inserted inside the transparent wrapper to be displayed therethrough. If separate labels are inserted inside the sheet 21 prior to wrapping, sealing and shrinking, then the labelling material should preferably be prestressed or tensilized and should have substantially the same heat shrinking characteristics as the sheet 21 after it has been formed with the package-contents receiving cavity. Then, when the final heat shrinking operation is performed, the label will shrink more or less uniformly with the wrapper and will avoid wrinkling in this area.

A package of this type having a label inside the wrapping and displayed through the face of sheet 21 is illustrated in FIGS. 18 and 19.

In FIG. 19 I have shown the completed package having the label 60 adjacent the face of the package encased in the sheet 21. The label may have advertising or instructional material imprinted thereon, and it is positioned in immediate contact with the sheet 21 so that the imprinted material is displayed therethrough.

The method of making the package is essentially the same as that of making the package without the label. Thus, the sheet 21 is the same and is initially prestressed or tensilized in the mold 30 in the manner described in column 4, line 47. The prestressed or tensilized sheet 21 is illustrated as removed from the mold 30 in the exploded view of FIG. 18 for purposes of clarity.

However, it should be understood that the prestressed sheet remains in the mold and the label 60 is inserted into the cup-shaped prestressed sheet in immediate contact with the face thereof. The label 60 is prestressed or tensilized and is preferably made of the same as or similar material to that from which the sheet 21 is made and has substantially the same coefficient of contraction.

After the label has been placed in the prestressed cup-shaped sheet 21 the sliced product 20 is inserted on top of the label; the second sheet 22 is arranged in superimposed relationship to the package contents and the first sheet; and the air is evacuated from the package and the two sheets are sealed together in the manner described in column 5, line 55. The package is then removed from the mold and is heat shrunk in the manner described in column 5, line 55.

It will be appreciated that my invention is not limited to the specific forming, shrinking or sealing apparatus and operations disclosed herein, nor is it limited to the specific materials set forth herein as examples. Also, it will be appreciated that the vacuum-forming apparatus shown and described herein may be automatically or semi-automatically operated instead of being manually operated. Accordingly, modifications may be made in my invention within the scope of the appended claims.

I claim:

1. The method of forming a package having a wrapper of protective, flexible sheet material smoothly embracing the package contents which comprises: providing a first sheet of thermoplastic wrapping material of sufficient stiffness and body to maintain its shape without external support, said thermoplastic material being in unstressed condition but being capable of being prestressed or tensilized when heated to plastic condition and then stretched and cooled; heating said first sheet until it becomes plastic and stretching and forming it to provide a convex outer surface and a concave inner surface with a package contents receiving cavity with an open face and a marginal flange extending completely around the peripheral edge thereof and disposed in the same plane, the said formed sheet of thermoplastic material being in prestressed or tensilized condition so that it will shrink when heated to a temperature at which the molecules can flow; providing a second sheet of wrapping material capable of being sealed to the first sheet and being in flat form and in unstressed condition so that it will not shrink when subjected to heat; thereafter applying the second sheet in flat form over the package contents and open face of the cavity and sealing the said second sheet to the marginal area of the first sheet and simultaneously extracting air from inside the package; and finally heating said wrapper to a temperature at which the molecules of said first sheet will flow to cause the first sheet to shrink to smoothly embrace and tightly engage the package contents and to stretch the second sheet smoothly over the face of the cavity and into overlapping relationship with the sides of the package contents.

2. The method of forming a package as set forth in claim 1 in which sheet labelling material which is heat shrinkable and has substantially the same coefficient of contraction as the first sheet after it is tensilized is placed between the package contents and the first sheet of wrapping material in immediate and intimate contact with said first sheet so that the said first sheet of wrapping material and labelling material shrink uniformly when the wrapper is heated.

3. The method of forming a package having a wrapper of protective, flexible sheet material smoothly embracing the package contents which comprises: providing a first sheet of thermoplastic wrapping material of sufficient stiffness and body to maintain its shape without external support and having a convex outer surface and a concave inner surface with a package contents receiving cavity having a laterally projecting marginal area extending completely around the peripheral edge thereof and disposed in the same plane, said first sheet being in prestressed or tensilized condition so that it will shrink when heated to a temperature at which the molecules will flow; providing a second sheet of wrapping material capable of being sealed to the first sheet and being in flat form and in unstressed condition so that it will not shrink when subjected to heat; thereafter applying the second sheet in flat form over the package contents and open face of the cavity and sealing the said second sheet to the marginal flange of the first sheet and simultaneously extracting air from inside the package; and finally heating said wrapper to a temperature at which the molecules of said first sheet will flow to cause the first sheet to shrink to smoothly embrace and tightly engage the package contents and to stretch the second sheet smoothly over the face of the package contents and into overlapping relationship with the sides of the package contents.

References Cited in the file of this patent

UNITED STATES PATENTS

| | | | |
|---|---|---|---|
| 2,289,668 | Mallory | July 14, | 1942 |
| 2,525,651 | Clunan | Oct. 10, | 1950 |
| 2,549,069 | Domofrio | Apr. 17, | 1951 |
| 2,565,887 | Salfisberg | Aug. 28, | 1951 |
| 2,597,041 | Stokes | May 20, | 1952 |
| 2,668,403 | Rumsey | Feb. 9, | 1954 |
| 2,712,208 | Campbell | July 5, | 1955 |
| 2,801,180 | Rumsey | July 30, | 1957 |
| 2,811,818 | McCarty | Nov. 5, | 1957 |
| 2,879,635 | Brock | Mar. 31, | 1959 |
| 2,888,787 | Cloud | June 2, | 1959 |